(12) United States Patent
Kim et al.

(10) Patent No.: US 12,483,448 B2
(45) Date of Patent: Nov. 25, 2025

(54) SERDES WITH ROBUST PARAMETER INITIALIZATION

(71) Applicant: Credo Technology Group Limited, Grand Cayman (KY)

(72) Inventors: Kyungjin Kim, San Jose, CA (US); Wenzhe Gao, Cupertino, CA (US); Alex Nazari, San Francisco, CA (US); Chad Cohen, San Jose, CA (US); Xin Chang, Santa Clara, CA (US)

(73) Assignee: Credo Technology Group Limited, Grand Cayman (KY)

( * ) Notice: Subject to any disclaimer, the term of this patent is extended or adjusted under 35 U.S.C. 154(b) by 112 days.

(21) Appl. No.: 18/387,731

(22) Filed: Nov. 7, 2023

(65) Prior Publication Data
US 2025/0150312 A1    May 8, 2025

(51) Int. Cl.
*H04L 25/03* (2006.01)

(52) U.S. Cl.
CPC .............. *H04L 25/03057* (2013.01)

(58) Field of Classification Search
CPC .... H04L 25/03057; H04L 27/06; H04L 27/01
USPC ....................................... 375/232
See application file for complete search history.

(56) References Cited

U.S. PATENT DOCUMENTS

| | | | |
|---|---|---|---|
| 8,457,254 B2* | 6/2013 | Khayrallah | H04L 27/38 375/340 |
| 10,317,525 B2 | 6/2019 | Sharonov et al. | |
| 10,778,194 B2* | 9/2020 | Li | G06N 20/10 |
| 11,018,656 B1 | 5/2021 | Sun | |
| 11,196,592 B1 | 12/2021 | Cai et al. | |
| 11,570,024 B2 | 1/2023 | Cai et al. | |
| 11,646,916 B2 | 5/2023 | Sun | |
| 2005/0254568 A1* | 11/2005 | Markman | H04L 25/03057 375/233 |
| 2008/0291335 A1* | 11/2008 | Markman | H04L 25/0307 348/725 |

* cited by examiner

*Primary Examiner* — Leila Malek
(74) *Attorney, Agent, or Firm* — RAMEY LLP; Daniel J. Krueger (57) ABSTRACT

Serializer/deserializer (SerDes) modules, equalizers, and equalization techniques having robust parameter initialization may substantially reduce convergence time. One illustrative equalizer includes: a discrete-time, finite impulse response ("FIR") filter to convert a receive signal to a filtered signal; a decision element to determine channel symbols represented by the filtered signal; and a controller. The controller is configured to, for each of multiple values in a search range, estimate a performance of the equalizer based on the channel symbols and at least one of the filtered signal or an input signal to the decision element; configured to find a centroid value based on the performance for each of the multiple parameter values in the search range; and configured to derive an initial value for the parameter from the centroid value.

20 Claims, 5 Drawing Sheets

SERDES WITH ROBUST PARAMETER INITIALIZATION

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval". A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by a sequence of two or more symbols.

Many digital communication links use only one bit per symbol; a binary '0' is represented by one symbol (e.g., an electrical voltage or current signal within a first range), and binary '1' by another symbol (e.g., an electrical voltage or current signal within a second range), but higher-order signal constellations are known and frequently used. In 4-level pulse amplitude modulation ("PAM4"), each symbol interval may carry any one of four symbols, often denoted as −3, −1, +1, and +3. Two binary bits can thus be represented by each symbol.

Channel non-idealities produce dispersion which may cause each symbol to perturb its neighboring symbols, a consequence termed "inter-symbol interference" ("ISI"). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers ("DFE") are often preferred for their ability to combat ISI without inherently amplifying the noise. As the name suggests, a DFE employs a feedback path to remove ISI effects derived from previously decided symbols. Other equalizer designs are also known. As symbol rates continue to increase, whichever equalizer is used must adapt to the channel to compensate for ever-increasing levels of ISI. To make the situation even more challenging, the chosen equalizer design must cope with potential changes in performance of its components due to process variation, supply voltage variation, and temperature variation (collectively, "PVT variations") as well as drift due to component aging.

A popular technique for coping with such changes is known as adaptive equalization, a technique in which an equalizer's parameters are iteratively adjusted until the equalizer's performance converges to an optimum value. A known challenge with adaptive equalization is the time that may be required for such convergence to occur. This convergence time can be reduced if the equalizer's parameters are initialized near their ideal values.

SUMMARY

Accordingly, there are disclosed herein serializer/deserializer (SerDes) modules, equalizers, and equalization techniques having robust parameter initialization that may substantially reduce convergence time. One illustrative equalizer includes: a discrete-time, finite impulse response ("FIR") filter to convert a receive signal to a filtered signal; a decision element to determine channel symbols represented by the filtered signal; and a controller. The controller is configured to, for each of multiple values in a search range, estimate a performance of the equalizer based on the channel symbols and at least one of the filtered signal or an input signal to the decision element; configured to find a centroid value based on the performance for each of the multiple parameter values in the search range; and configured to derive an initial value for the parameter from the centroid value.

An illustrative equalization method includes: converting a receive signal to a filtered signal using a discrete-time, finite impulse response ("FIR") filter; using a decision element to determine channel symbols represented by the filtered signal; estimating the equalization performance for each of multiple parameter values in a search range; finding a centroid value based on the equalization performance for each of the multiple parameter values in the search range; and deriving an initial value for the parameter from the centroid value.

Each of the foregoing may be implemented individually or conjointly, together with any one or more of the following features in any suitable combination: 1. the search range is a narrowed search range determined based on three spread values from a full search range. 2. the three spread values are $¼$, $2/4$, and $¾$ of the way through the search range. 3. the narrowed search range spans half of the full search range and is centered on whichever of the three spread values provides a best performance. 4. the parameter is a coefficient of the FIR filter. 5. the parameter is one of multiple parameters. 6. the error module is configured to repeat the estimating, finding, and deriving operations for each of the multiple parameters. 7. the parameter is a decision threshold used by the decision element. 8. the equalizer includes a feedback filter to convert the channel symbols into a feedback signal; and a summer that combines the feedback signal with the filtered signal to provide the decision element with an equalized signal. 9. the parameter is a coefficient of the feedback filter. 10. the decision element includes a decision feedback precompensation unit, and the parameter is a precompensation value. 11. The equalizer of claim 1, wherein the error module is configured to adapt the initial value based on a performance of the equalizer with the initial value for the parameter.

DETAILED DESCRIPTION

Note that the specific embodiments given in the drawings and following description do not limit the disclosure. On the contrary, they provide the foundation for one of ordinary skill to discern the alternative forms, equivalents, and modifications that are encompassed in the claim scope.

Figure 1:
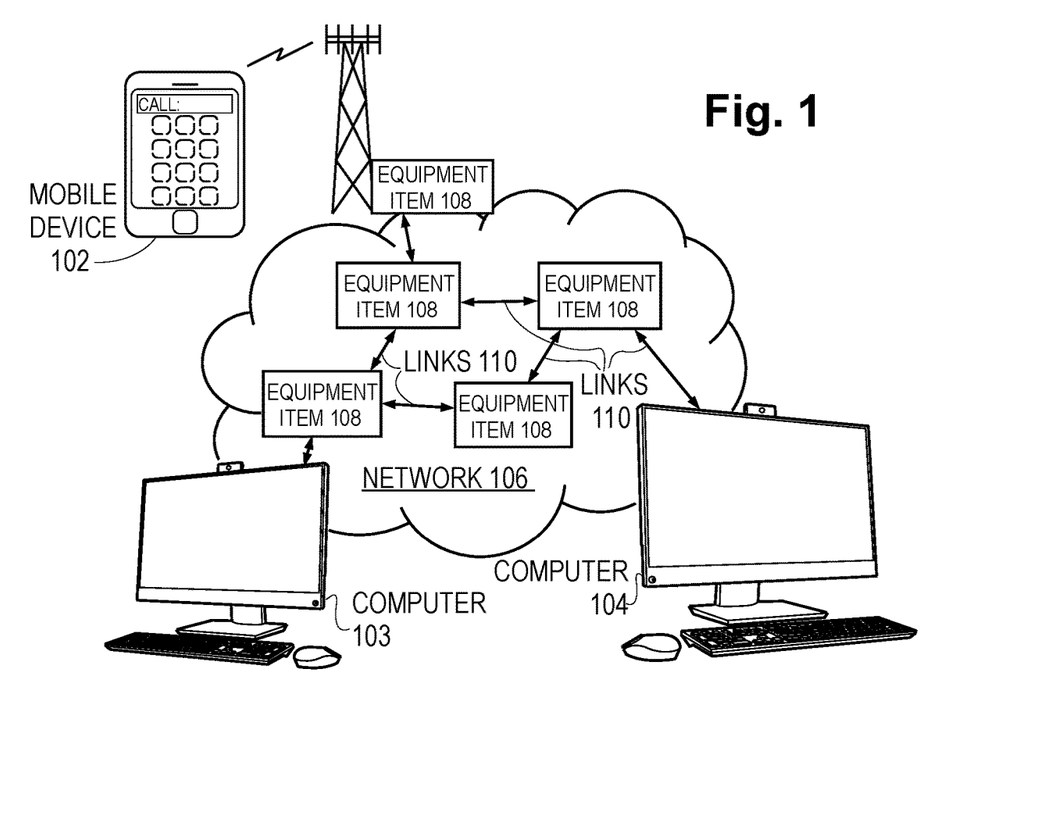
FIG. 1 shows an illustrative computer network.

The disclosed equalizers and equalization methods are best understood in the context of the larger environments in which they operate. Accordingly, FIG. 1 shows an illustrative communications network including a mobile device 102 and computer systems 103-104 coupled via a packet-switched routing network 106. The routing network 106 may be or include, for example, the Internet, a wide area network, or a local area network. In FIG. 1, the routing network 106 includes a network of equipment items 108, such as hubs, switches, routers, bridges, and the like. The equipment items 108 are connected to one another, and to the computer systems 103-104, via point-to-point communication links 110 that transport data between the various network components.

Figure 2:
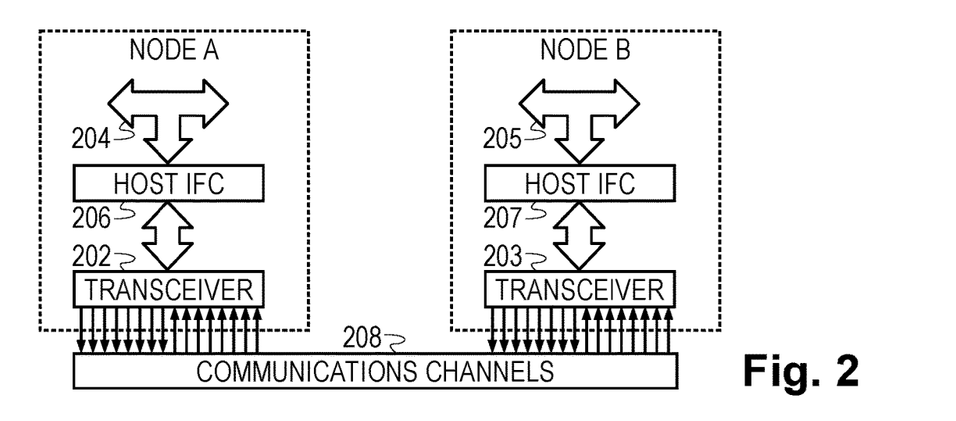
FIG. 2 is a block diagram of an illustrative point-to-point communication link.

FIG. 2 is a diagram of an illustrative point-to-point communication link that may be representative of links 110 in FIG. 1. The illustrated embodiment includes a first node ("Node A") in communication with a second node ("Node B"). Nodes A & B can each be, for example, any one of mobile devices 102, equipment items 108, computer systems 103-104, or other sending/receiving devices suitable for high-rate digital data communications.

Node A includes a transceiver 202 coupled to Node A's internal data bus 204 via a host interface 206. Similarly, Node B includes a transceiver 203 coupled to its internal bus 205 via a host interface 207. Data transfers internal to the nodes may occur via, e.g., parallel 64- or 128-bit buses. When data blocks need to be conveyed to or from a remote destination, the host interfaces 206, 207 may convert between internal data formats and network packet formats and may provide packet sequencing and buffering for the transceivers. The transceivers 202, 203 serialize the packet payloads for transmission via high-bandwidth communications channels 208, and process receive signals to extract the transmitted data.

The communication channels 208 extend between the transceivers 202, 203. The channels 208 may include, for example, transmission media such as fiber optic cables, twisted pair wires, coaxial cables, backplane transmission lines, and wireless communication links. (It is also possible for the channels to be formed by a magnetic or optical information storage medium, with the write-read transducers serving as transmitters and receivers.) Bidirectional communication between Node A and Node B can be provided using separate unidirectional channels, or in some circumstances, a single channel that transports signals in opposing directions without interference. The channel signal may be, for example, an electrical voltage, an electrical current, an optical power level, a wavelength, a frequency, a phase value, or any suitable attribute of energy that passes from the beginning of the channel to its terminus. The transceivers include receivers that process the received channel signals to reconstruct the transmitted data.

Figure 3:
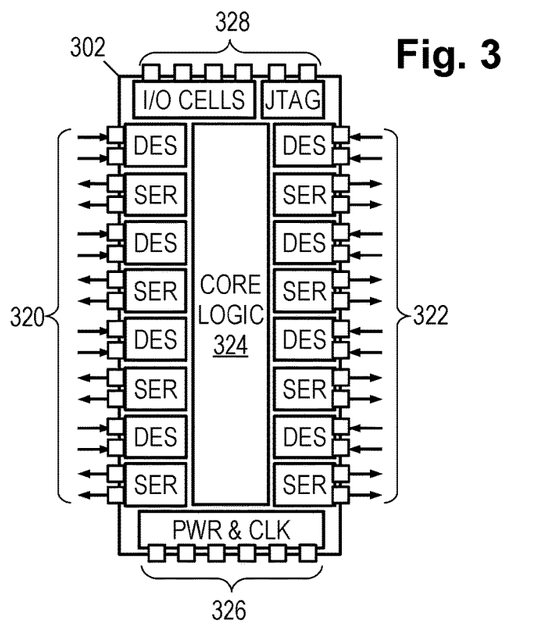
FIG. 3 is a block diagram of an illustrative serializer-deserializer integrated circuit device.

FIG. 3 shows an illustrative monolithic transceiver chip 302. Chip 302 includes SerDes modules with contacts 320 for receiving and transmitting high-rate serial bitstreams across eight lanes of a communication channel 208, additional SerDes modules with contacts 322 for conveying the high-rate serial bitstreams to the host interface 206, and core logic 324 for implementing a channel communications protocol while buffering bitstreams between the channel and host interface. Also included are various supporting modules and contacts 326, 328, such as power regulation and distribution, clock generation, digital input/output lines for control signals, and a JTAG module for built-in self testing.

The "deserializer" implements the receiving function of the chip 302, implementing decision feedback equalization ("DFE") or any other suitable equalization technique including those that employ a discrete-time finite impulse response ("FIR") filter with adjustable tap coefficients, e.g., linear equalization, partial response equalization. At the contemplated symbol rates (above 50 Gbd), the chosen equalizer operates under severe timing constraints.

Figure 4:
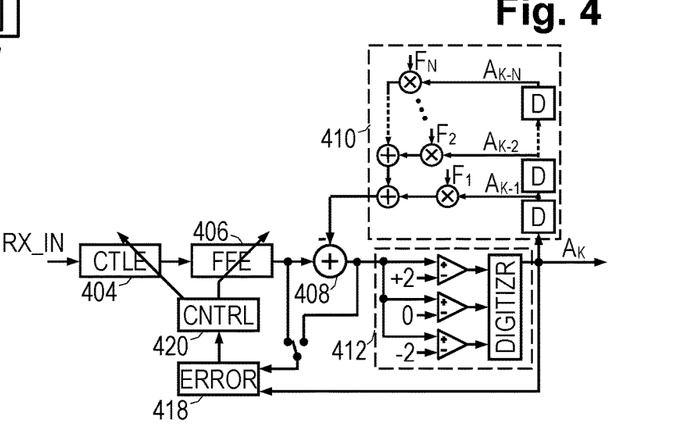
FIG. 4 is a block diagram of an illustrative decision feedback equalizer ("DFE").

FIG. 4 shows an illustrative implementation of a DFE configured for receiving PAM4 signals. An optional continuous time linear equalization ("CTLE") filter 404 provides analog filtering to bandlimit the signal spectrum while optionally boosting high-frequency components of the receive signal RX_IN. A feed-forward equalization ("FFE") filter 406 minimizes leading inter-symbol interference ("ISI") while optionally reducing the length of the channel impulse response. A summer 408 subtracts a feedback signal, provided by feedback filter 410, from the filtered signal provided by the FFE filter 406 to produce an equalized signal in which the effects of trailing ISI have been minimized. A decision element 412, sometimes called a "slicer", operates on the equalized signal to determine which symbol it represents in each symbol interval. The resulting stream of symbol decisions is denoted $A_k$, where k is the time index.

In the illustrated example, the symbols are presumed to be PAM4 (−3, −1, +1, +3), so the comparators employed by decision element 412 use the decision thresholds −2, 0, and +2, respectively. (The unit for expressing symbol and threshold values is omitted for generality, but for explanatory purposes may be presumed to be volts.) The comparator outputs can be taken collectively as a thermometer-coded digital representation of the output symbol decision, or a digitizer may optionally be used to convert the comparator outputs into a binary number representation, e.g., 00 to represent −3, 01 to represent −1, 10 to represent +1, and 11 to represent +3. Alternatively, a Gray-coded representation could be employed.

The DFE generates the feedback signal with a feedback filter 410 having a series of delay elements D (e.g., latches, flip flops, or a shift register) that store the recent output symbol decisions ($A_{k-1}$, $A_{k-2}$, . . . , $A_{k-N}$, where N is the number of filter coefficients $F_i$). A set of multipliers determines the product of each symbol with a corresponding filter coefficient, and a summer arrangement combines the products to obtain the feedback signal. Where the short symbol intervals make it infeasible to implement the feedback filter 410, the decision element 408 may be modified into a precompensation unit to "unroll" one or more taps of the feedback filter, potentially eliminating the feedback filter entirely. The precompensation unit provides speculative decisions to a multiplexing arrangement as described in, e.g., U.S. Pat. No. 8,301,036 ("High-speed adaptive decision feedback equalizer") and U.S. Pat. No. 9,071,479 ("High-speed parallel decision feedback equalizer"), which are each incorporated herein by reference in their entireties.

As an aside, we note here that a timing recovery unit is typically included with any practical DFE implementation, but this consideration is addressed in the literature and generally known to those skilled in the art. Nevertheless, we note here that at least some contemplated embodiments include one or more additional comparators to be employed for comparing the combined signal to one or more of the extreme symbol values (−3, +3), thereby providing an error polarity signal that can be used for timing recovery with, e.g., a "bang-bang" design.

The FFE filter 406 is an analog discrete-time FIR filter or, if preceded by an analog-to-digital converter, a digital discrete-time FIR filter. In either case, FFE filter 406 has adjustable tap coefficients. An error module 418 measures equalization error by subtracting the symbol decision for a given symbol interval from the value of the filtered signal for that symbol interval. Alternatively, the error module 418 measures equalization error by subtracting the symbol decision from the equalized signal that forms the input to the decision element 412 (i.e., the output of summer 408) for that symbol interval. A controller 420 may adapt the coefficients of the filters 404, 406, 410 based on a correlation between the equalization error and the symbol decisions to minimize residual error. Alternatively, or in addition, the error module 418 and/or the controller 420 may estimate an equalization performance. The equalization performance can be measured in various ways including residual noise power, signal to noise ratio, eye opening size (aka decision margin), bit error rate, etc. To make such performance measurements the error module 418 may incorporate a level finder such as that disclosed in U.S. Pat. No. 11,018,656 ("Multi-function level finder for Serdes"), which is hereby incorporated herein by reference in its entirety. As yet another alternative, the error module 418 may collect an equalization error histogram or other signal or error statistics from which a bit or symbol error rate can be estimated.

The controller 420 may be a programmable processor configured with firmware or an application specific integrated circuit configured to systematically vary one or more equalization parameters and determine which values optimize the estimated equalization performance. The parameters may include, e.g., filter coefficients and decision thresholds. Optimizing the equalization performance may include minimizing an estimated bit error rate or maximizing an eye opening. After an initial optimization phase, the controller 420 may then employ adaptive equalization techniques to further refine the parameter values.

Figure 5:
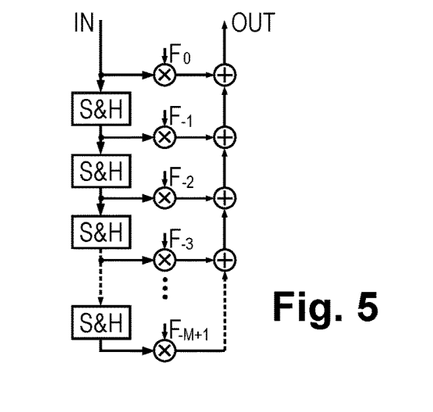
FIG. 5 is a block diagram of an illustrative discrete-time, finite impulse response ("FIR") filter.

FIG. 5 shows an illustrative implementation of an analog discrete-time FIR filter, which could be used for FFE filter 406. An input signal is supplied to a sequence of sample and hold ("S&H") elements. A first of the S&H elements captures the input signal value once in each symbol interval while outputting the captured value from the preceding symbol interval. Each of the other S&H elements captures the held value from the preceding element, repeating the operation to provide increasingly delayed input signal values. A set of analog signal multipliers scales each of the input values in the sequence by corresponding coefficients $F_i$, supplying the scaled values to a summer that outputs the sum of the scaled input values. This weighted sum may be referred to herein as the filtered signal.

Figure 6:
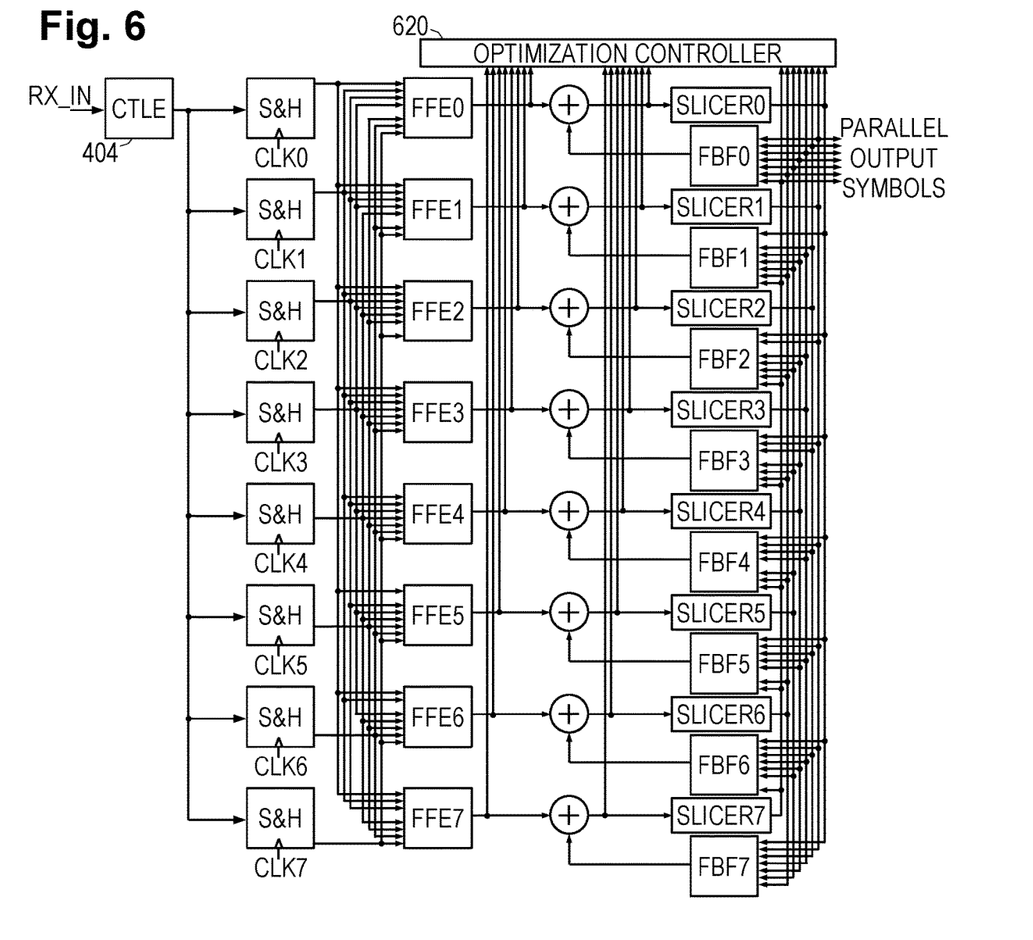
FIG. 6 is a block diagram of an illustrative parallel DFE.

The FFE filter of FIG. 5 requires a large number of operations to be performed in each symbol interval, which becomes increasingly challenging as the symbol interval grows ever smaller. FIG. 6 accordingly provides a parallelized version of the FFE filter (with parallelized decision elements and feedback filters as well).

Figure 7:
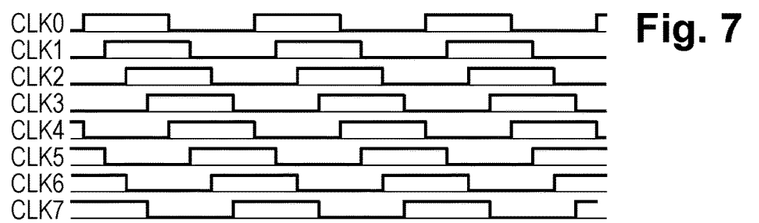
FIG. 7 is a clock signal timing diagram for the parallelized DFE.

In FIG. 6, CTLE filter 404 bandlimits the receive signal before supplying it in parallel to an array of S&H elements. Each of the S&H elements is provided with a respective clock signal, each of the clock signals having a different phase, causing the elements in the array to take turns sampling the input signal. Only one of the S&H element outputs is transitioning at any given time. See FIG. 7 for an illustration of how the clock signals may be shifted in phase relative to each other. Note that the duty cycle shown is merely illustrative; the point meant to be conveyed by the diagram is the sequential nature of transitions in the different clock signals.

An array of FFE filters (FFE0 through FFE7), each form a weighted sum of the S&H element outputs. The weighted sums employ filter coefficients that are cyclically shifted relative to each other. FFE0 operates on the held signals from the 3 S&H elements operating prior to CLK0, the S&H element responding to CLK0, and the 3 S&H elements operating subsequent to CLK0, such that during the assertion of CLK4, the weighted sum produced by FFE0 corresponds to the output of FFE filter 406 (FIGS. 4 and 5). FFE1 operates on the held signals from the 3 S&H elements operating prior to CLK1, the S&H element responding to CLK1, and the 3 S&H elements operating subsequent to CLK1, such that during the assertion of CLK5, the weighted sum corresponds to that of FFE filter 406. And the operation of the remaining FFE filters in the array follow the same pattern with the relevant phase shifts. In practice, the number of filter taps may be smaller, or the number of elements in the array may be larger, so as to offer a longer window of valid output.

As with the equalizer of FIG. 4, a summer may combine the output of each FFE filter with a feedback signal to provide an equalized signal to a corresponding decision element. FIG. 6 shows an array of decision elements (Slicer0 through Slicer7), each operating on an equalized signal derived from a respective FFE filter output. As with the decision element 412 of FIG. 4, the illustrated decision elements employ comparators to determine which symbol the equalized signal most likely represents. The decisions are made while the respective FFE filter outputs are valid (e.g., Slicer0 operates while CLK4 is asserted, Slicer1 operates while CLK5 is asserted, etc.). The symbol decisions may be provided in parallel on an output bus to enable a lower clock rate to be used for subsequent on-chip operations.

An array of feedback filters (FBF0 through FBF7) operates on the preceding symbol decisions to provide the feedback signals for the summers. As with the FFE filters, the inputs for the feedback filters are shifted cyclically and provide a valid output only when the inputs correspond to the contents of the feedback filter 410 (FIG. 4), coinciding with the time window for the corresponding FFE filter. In practice, the number of feedback filter taps may be smaller than what is shown, or the number of array elements may be larger, so as to offer a longer window of valid output.

As with the decision element 412 of FIG. 4, the decision elements in FIG. 6 may each employ additional comparators to provide timing recovery info, coefficient training info, and/or precompensation to unroll one or more taps of the feedback filter. After accounting for the cyclic shifts, the same tap coefficients may be used for each of the FFE filters and for each of the feedback filters. Optimization controller 620 may be a parallelized version of controller 420, collecting parallel symbol decisions and combining them with the FFE outputs or the decision element inputs to compute equalization errors, estimate equalizer performance, and to set or adapt coefficients and/or decision thresholds.

Figure 8A:
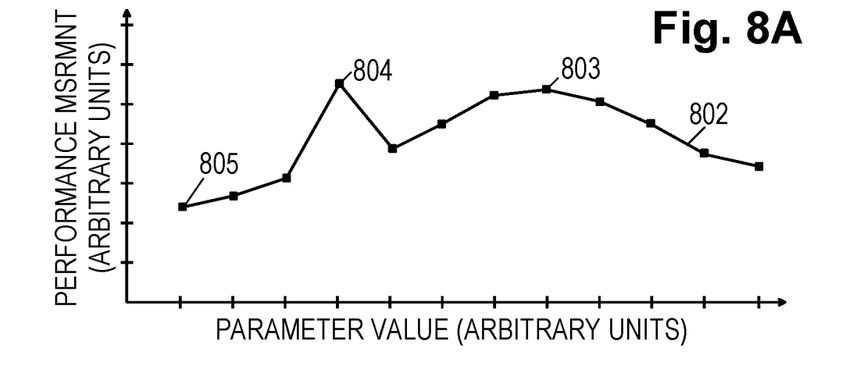
FIG. 8A is a graph of an illustrative equalizer performance as a function of a parameter value.

During an initialization of the equalizer, the controller may systematically vary the value of a parameter and estimate the equalizer performance for each value. FIG. 8A shows an illustrative curve 802 of performance versus parameter value. The performance curve may be expected to be a smooth curve with a peak or a valley corresponding to an optimum performance. However, the performance estimation process is subject to some uncertainty; for example, certain channel symbol patterns may produce unexpectedly good or unexpectedly poor estimated performance as the parameter value is being varied. In FIG. 8A, point 803 is the optimum equalizer performance, but point 804 is an unexpectedly good estimated performance that may cause the controller to erroneously select a suboptimal parameter value. Point 805 corresponds to the minimum estimated performance.

To minimize the effect of unexpectedly good or poor estimated performance, the optimization controller 620 may find a centroid of the estimated performance curve 802 and select the parameter value corresponding to that centroid. The centroid calculation process has been found to function best if the performance curve 802 is first normalized. For curves where the optimum value corresponds to a peak, the normalization is performed by subtracting the minimum estimated performance 805 from each value. For curves where the optimum value corresponds to a valley, the normalization may be performed by subtracting each value from the maximum estimated performance.

Figure 8B:
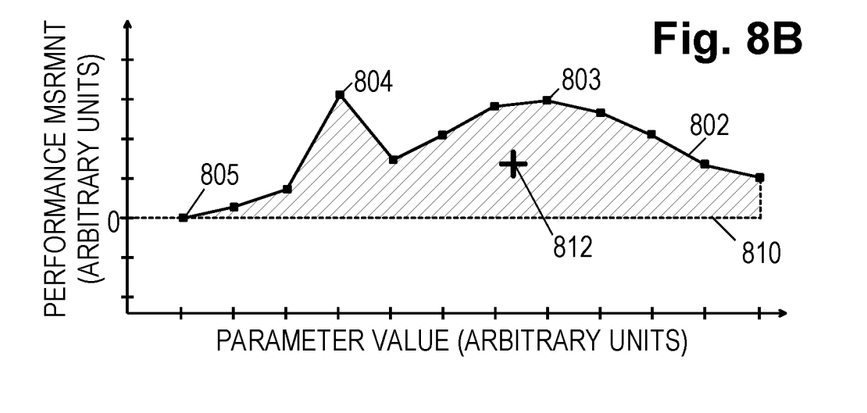
FIG. 8B is a graph of an area defined by the performance/parameter value curve.
Figure 8C:
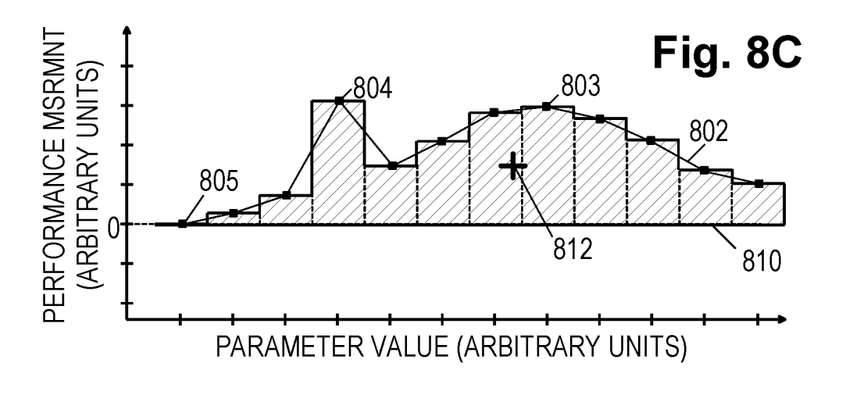
FIG. 8C is a graph of an area defined by the performance/discrete parameter value curve.

FIG. 8B shows the area 810 enclosed between the normalized curve 802 and the horizontal axis. The controller 620 may calculate the parameter value $\bar{x}$ corresponding to the centroid 812 as:

$$\bar{x} = \frac{\int_a^b x f(x) dx}{\int_a^b f(x) dx},$$

where a, b, are the minimum and maximum parameter values, and f(x) is the normalized performance curve. In practice, the calculation may be the numerical approximation:

$$\bar{x} = \frac{\Sigma_{i=1..N} x_i f(x_i)}{\Sigma_{i=1..N} f(x_i)},$$

where $x_i$ for i=1 ... N are the parameter values and $f(x_i)$ are normalized performance curve values. FIG. 8C shows the area 810 and corresponding centroid 812 for the numerical approximation of the illustrative curve 802.

The parameter value $\bar{x}$ corresponding to the centroid will typically be between two of the parameter values $x_i$ for performance curve. The controller may be configured to round the calculated parameter value $\bar{x}$ to the nearest parameter value setting $x_i$.

To reduce the search space and thereby expedite the initialization process, the controller may be configured to detect a performance trend using spread parameter values. For example, the controller may estimate performance for a parameter value at the midpoint between the lower and upper ends of the parameter value range. The controller may further estimate performance for parameter values midway between the midpoint and the lower end of the range, and midway between the midpoint and the upper end of the range. Thus, the controller may estimate performance for parameter values ¼, ½, and ¾ of the way through the full search range.

Figure 9A:
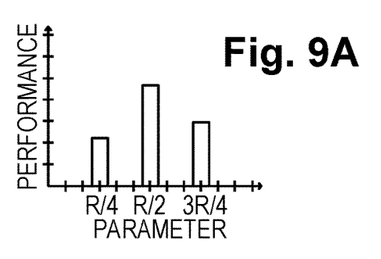
FIGS. 9A-9D are graphs of different performance curve scenarios.

As shown in FIGS. 9A-9D, such spread value measurements may reveal that the performance curve exhibits a trend. FIG. 9A shows a trend in which the midpoint of the performance curve exceeds the performance at the ¼ and ¾ points. In this case, the peak of the performance curve may be expected to fall between the ¼ and ¾ points, and the controller need not estimate performance for parameter values outside of this range, trimming the search range in half. The controller may round the parameter value $\bar{x}$ corresponding to the centroid of the narrowed search range to the nearest parameter value setting $x_i$.

Figure 9B:
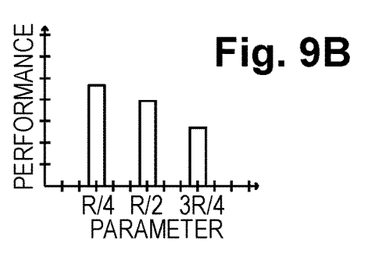

FIG. 9B shows a downward trend in which the performance at the ¼ point exceeds the midpoint performance, which in turn exceeds the ¾-point performance. In this case, the peak of the performance curve may be expected to fall between the midpoint and the lower end of the range so that the controller need not estimate performance for parameter values above the midpoint, trimming the search range in half. As a further refinement, the controller may round the parameter value $\bar{x}$ corresponding to the centroid of the narrowed search range to the next lowest parameter value setting $x_i$, as this may tend to be closer to the optimum than simply rounding to the nearest parameter value setting.

Figure 9C:
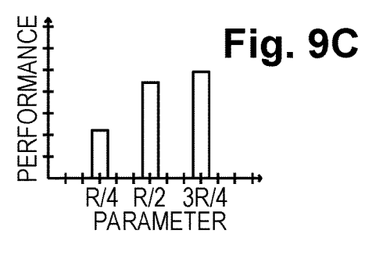

FIG. 9C shows an upward trend in which the performance at the ¾ point exceeds the midpoint performance, which in turn exceeds the ¼-point performance. In this case, the peak of the performance curve may be expected to fall between the midpoint and the upper end of the range so that the controller need not estimate performance for parameter values below the midpoint, trimming the search range in half. As a further refinement, the controller may round the parameter value $\bar{x}$ corresponding to the centroid of the narrowed search range to the next highest parameter value setting $x_i$, as this may tend to be closer to the optimum than simply rounding to the nearest parameter value setting.

In each of these examples, the controller may accordingly narrow the search range and determine a centroid of the performance curve within the narrowed search range.

Figure 9D:
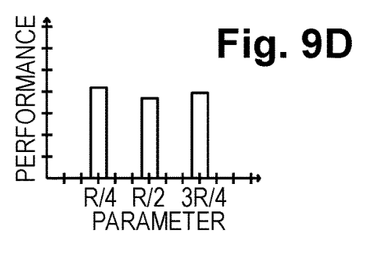

FIG. 9D shows an example in which no trend is readily apparent, whether because the midpoint performance is less than that of the ¼ and ¾ points, or simply because the performance values demonstrate no significant variation. In this example, the controller may be configured to estimate performance for each parameter value in the full search range and to determine the centroid of the resulting performance curve. The controller may round the parameter value $\bar{x}$ corresponding to the centroid of the narrowed search range to the nearest parameter value setting.

Figure 10:
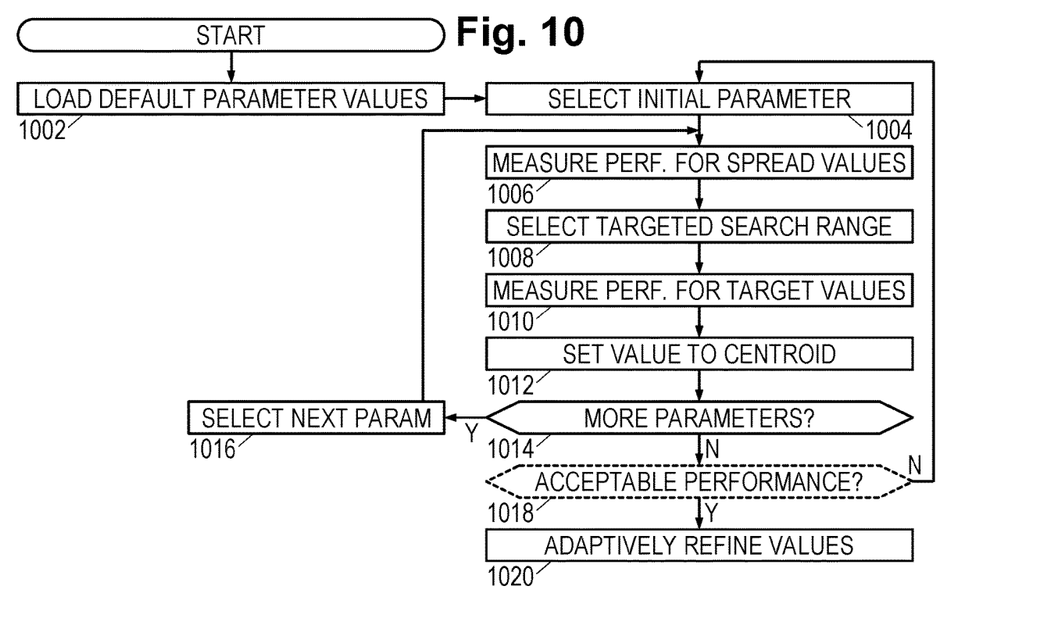
FIG. 10 is a flow diagram of an illustrative equalization method.

FIG. 10 is a flow diagram of an illustrative equalization method that may be implemented by controller 420 or 620. In block 1002, the controller initializes the equalizer parameters with default values. In block 1004, the controller selects a first parameter to optimize. As an example, the controller may select FFE coefficient $F_{-1}$ as the initial coefficient. In block 1006, the controller determines the estimated equalizer performance for three spread parameter values, e.g., ¼, ½, and ¾ of the way through the full search range. Based on the observed trend, the controller selects a narrowed search range in block 1008, e.g., centered on the best observed performance. In block 1010, the controller determines estimated equalizer performance for each parameter value in the narrowed search range. In block 1012, the controller normalizes the performance curve and finds a parameter value x̄ corresponding to the centroid of the performance curve within the narrowed search range, rounding as appropriate for the observed trend. In block 1014, the controller determines whether there are other parameters to be optimized, and if so, selects the next parameter in block 1016 before repeating blocks 1006 through 1014. In optional block 1018, the controller determines whether adequate performance has been achieved, and if not, repeats blocks 1004-1018. Thereafter, the controller may adaptively refine the parameter values in block 1020 using a known adaptation technique.

Numerous alternative forms, equivalents, and modifications will become apparent to those skilled in the art once the above disclosure is fully appreciated. Though the foregoing description uses a DFE for illustration, the principles are applicable to all equalizers including adjustable parameter values. The order of operations described in the flow diagram and shown in the equations can be varied, with certain operations being reordered, pipelined and/or performed in parallel. It is intended that the claims be interpreted to embrace all such alternative forms, equivalents, and modifications where applicable.

What is claimed is:

1. An equalizer that comprises:
    a discrete-time, finite impulse response ("FIR") filter to convert a receive signal to a filtered signal;
    a decision element to determine channel symbols represented by the filtered signal; and
    a controller that is:
        configured to, for each of multiple values in a search range for an equalization parameter, estimate a performance of the equalizer based on the channel symbols and at least one of the filtered signal or an input signal to the decision element;
        configured to find a centroid value based on the performance for each of the multiple values in the search range; and
        configured to derive an initial value for the equalization parameter from the centroid value.

2. The equalizer of claim 1, wherein the search range is a narrowed search range determined based on three spread values from a full search range.

3. The equalizer of claim 2, wherein the three spread values are ¼, 2/4, and ¾ of the way through the search range.

4. The equalizer of claim 3, wherein the narrowed search range spans half of the full search range and is centered on whichever of the three spread values provides a best performance.

5. The equalizer of claim 1, wherein the equalization parameter is a coefficient of the FIR filter.

6. The equalizer of claim 1, wherein the equalization parameter is one of multiple equalization parameters, and wherein the controller is configured to repeat the estimating, finding, and deriving operations for each of the multiple equalization parameters.

7. The equalizer of claim 1, wherein the equalization parameter is a decision threshold used by the decision element.

8. The equalizer of claim 1, further comprising:
    a feedback filter to convert the channel symbols into a feedback signal; and
    a summer that combines the feedback signal with the filtered signal to provide the decision element with an equalized signal,
    wherein the equalization parameter is a coefficient of the feedback filter.

9. The equalizer of claim 1, wherein the decision element includes a decision feedback precompensation unit, and wherein the equalization parameter is a precompensation value.

10. The equalizer of claim 1, wherein the controller is configured to adapt the initial value based on the performance of the equalizer with the initial value for the equalization parameter.

11. An equalization method that comprises:
    converting a receive signal to a filtered signal using a discrete-time, finite impulse response ("FIR") filter;
    using a decision element to determine channel symbols represented by the filtered signal;
    estimating an equalization performance for each of multiple parameter values in a search range for an equalization parameter;
    finding a centroid value based on the equalization performance for each of the multiple parameter values in the search range; and
    deriving an initial value for the equalization parameter from the centroid value.

12. The equalization method of claim 11, wherein the search range is a narrowed search range determined based on three spread values from a full search range.

13. The equalization method of claim 12, wherein the three spread values are ¼, 2/4, and ¾ of the way through the search range.

14. The equalization method of claim 13, wherein the narrowed search range spans half of the full search range and is centered on whichever of the three spread values provides a best equalization performance.

15. The equalization method of claim 11, wherein the equalization parameter is a coefficient of the FIR filter.

16. The equalization method of claim 11, wherein the equalization parameter is one of multiple equalization parameters, and wherein the controller is configured to repeat the estimating, finding, and deriving operations for each of the multiple equalization parameters.

17. The equalization method of claim 11, wherein the equalization parameter is a decision threshold used by the decision element.

18. The equalization method of claim 11, further comprising:
    using a feedback filter to convert the channel symbols into a feedback signal; and
    combining the feedback signal with the filtered signal to provide the decision element with an equalized signal,
    wherein the equalization parameter is a coefficient of the feedback filter.

19. The equalization method of claim 11, wherein the decision element includes a decision feedback precompensation unit, and wherein the equalization parameter is a precompensation value.

20. The equalization method of claim 11, further comprising adapting the initial value based on the equalization performance with the initial value for the equalization parameter.

* * * * *